(12) United States Patent
Kanazirev et al.

(10) Patent No.: US 8,278,242 B2
(45) Date of Patent: Oct. 2, 2012

(54) HYDROTHERMALLY STABLE ALUMINA

(75) Inventors: Vladislav I. Kanazirev, Arlington Heights, IL (US); Peter Rumfola, III, Bueche, LA (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 13/007,845

(22) Filed: Jan. 17, 2011

(65) Prior Publication Data

US 2011/0111955 A1 May 12, 2011

Related U.S. Application Data

(60) Continuation-in-part of application No. 12/620,225, filed on Nov. 17, 2009, now abandoned, which is a division of application No. 11/439,547, filed on May 24, 2006, now Pat. No. 7,981,836.

(51) Int. Cl.
*B01J 20/00* (2006.01)
(52) U.S. Cl. ..................... 502/407; 502/415
(58) Field of Classification Search .............. 423/111, 423/274, 275; 502/407, 414, 415, 439
See application file for complete search history.

(56) References Cited

U.S. PATENT DOCUMENTS

| 3,923,692 A | 12/1975 | Braithwaite et al. |
| 5,096,871 A * | 3/1992 | Lever et al. .................. 502/411 |
| 7,981,836 B2 * | 7/2011 | Kanazirev et al. ............ 502/439 |
| 2002/0157535 A1* | 10/2002 | Kanazirev et al. ................ 95/96 |
| 2003/0134742 A1* | 7/2003 | Kanazirev et al. ............ 502/300 |

FOREIGN PATENT DOCUMENTS

EP 1236496 A1 9/2002

* cited by examiner

*Primary Examiner* — Steven Bos
(74) *Attorney, Agent, or Firm* — Mark Goldberg

(57) ABSTRACT

The hydrothermal stability of transition aluminas used as adsorbents and catalyst carriers is improved through their treatment with a soluble silicon inorganic compound such as sodium silicate wherein the silicon compound is mixed with the alumina powder at the production stage of forming particulates by liquid addition. The silicon containing particulates are activated by heating at a temperature lower than 500° C. and treated, before or after the thermal activation, by a colloidal silica solution to produce a hydrothermally stable, low dust alumina. The total silica content of the final product is typically less than 5 mass-%.

8 Claims, No Drawings

HYDROTHERMALLY STABLE ALUMINA

CROSS-REFERENCE TO RELATED APPLICATIONS

This application is a Continuation-In-Part of copending application Ser. No. 12/620,225 filed Nov. 17, 2009, which application is a Division of copending application Ser. No. 11/439,547 filed May 24, 2006, the contents of which are hereby incorporated by reference in their entirety.

FIELD OF THE INVENTION

The present invention relates to a hydrothermally stable alumina, its process of manufacture and its use as a desiccant. More specifically, the present invention relates to a process of treating transition aluminas with a soluble silicon inorganic compound.

The industrial activated alumina adsorbents are produced exclusively by the rapid (flash) calcination of the Bayer process derived aluminum hydroxide (Gibbsite, ATH) powder followed by wet agglomeration and thermal activation. These adsorbents exhibit X-ray diffraction patterns of transition alumina phases. They typically have high BET surface area and good adsorption properties for moisture and other contaminants. This makes them suitable for treatment of various industrial streams.

Most of the adsorption processes using activated alumina require frequent thermal regeneration to remove the adsorbed water and to render the adsorbent active for the next adsorption cycle. In the course of regeneration, the adsorbent experiences the simultaneous effect of elevated temperature, pressure and high moisture content, with hot liquid water percolating through the adsorbent bed, causing hydrothermal aging and loss of adsorption performance.

While the loss of performance over regeneration cycles is small in some desiccant applications and the adsorbent can last thousand of cycles, there are some severe applications resulting in much faster deterioration of performance, which are challenging even for the most stable alumina adsorbents.

Natural gas drying presents the most prominent example of a severe application.

Activated aluminas have been widely used for NG drying for about twenty years. However, the short lifetime caused by hydrothermal aging led to replacement of activated alumina by molecular sieves in most of the units. In spite of this, the inlet portion of the adsorbent bed still needs a protective layer of another adsorbent capable to handle the carryover of liquids and heavy hydrocarbons.

Alumina quickly loses its drying performance when used as protective layer. Hence, there is a need of a hydrothermally stable alumina that will provide both protection against heavy hydrocarbons and additional drying capacity in the equilibrium portion of the bed. It is known that activated alumina is superior to molecular sieves as desiccants at high water concentrations.

Another example of severe desiccant applications are some internally heated dryer for compressed air where a quick deterioration of cyclic adsorbent performance takes place.

In spite of the fact that the need of improvement in the hydrothermal stability of activated alumina has been acknowledged (see the article of R. Dale Woosley "Activated Alumina Desiccants" in ALUMINA CHEMICALS—SCIENCE AND TECHNOLOGY HANDBOOK edited by L. D. Hart, American Ceramic Society, 1990, page 241-250), there remains a lack in reported success in preparing hydrothermally stable aluminas.

U.S. Pat. No. 4,778,779 by Murrell et al. discloses a composition comprising discrete particles of bulk silica supported on the external surface of a porous gamma alumina support. Aqueous colloidal silica is claimed as a source of the silica material. Heating above 500° C. in presence of steam is required to disperse at least a portion of the silica over the alumina surface. Preparation of active cracking catalysts, not the improvement of the material stability, is the focus of the invention by Murrell et al. High temperature is needed in order for the alumina and the silica components to form an active aluminosilicate phase.

U.S. Pat. No. 4,013,590 discloses that the mechanical and thermal properties of aluminum oxide are improved through their impregnation with an organic silicon compound dissolved in an organic solvent followed by thermal treatment and controlled oxidation at 500° C. Colloidal silica does not work for this purpose and it is listed in the patent as a "negative" example.

The patent above and other literature sources deal with the BET surface area stability of alumina towards high temperature treatments. The focus of these prior art developments is to delay the alumina phase transformation in high temperature application such as catalysts for exhaust gas treatment. Besides cerium, rare-earth and alkaline-earth elements, silicon was also found to have stabilizing effect on alumina. The paper "Stabilization of Alumina toward Thermal Sintering by Silicon Addition" authored by Bernard Beguin et al., J. OF CATALYSIS, 127, 595-604, (1991) studies the thermal stability of alumina toward sintering at 1050° to 1220° C. in presence of steam. The authors assume that the hydroxyl groups of alumina react with the silicon containing precursor.

W. R. Grace U.S. Pat. No. 5,147,836; U.S. Pat. No. 5,304,526 and U.S. Pat. No. 6,165,351 cover preparation of silica-containing bayerite alumina which is used to obtain hydrothermally stable silica "stabilized" eta alumina. The latter may be used in preparation of catalytic compositions, especially for the catalytic cracking Sodium silicate is added to the aluminum sulfate, sodium aluminate and magnesium hydroxide which are further mixed and reacted to precipitate the bayerite alumina.

Phosphorus has been also found useful for improving the thermal stability of gamma alumina with regard to sintering and phase transition to alpha alumina (see, for example, the paper from A. Stanislaus et al. "Effect of Phosphorus on the Acidity of gamma—Alumina and on the Thermal Stability of gamma-Alumina Supported Nickel-Molybdenum Hydrotreating Catalysts", published in APPLIED CATALYSIS, 39, 239-253 (1988). In addition to improving the thermal stability, phosphorous alters the acidity of the source alumina.

In 1992, Alcan obtained U.S. Pat. No. 5,096,871 entitled "Alumina-Alkali Metal Aluminum Silicate Agglomerate Acid Adsorbent". This patent does not refer to improvement of hydrothermal stability of the alumina, but describes the addition of sodium silicate and sodium aluminate in the agglomeration process of alumina powder to form an alkali metal aluminum silicate coating on the internal surfaces of alumina. This alkali metal coating provides the functionality of the agglomerate to serve as an adsorbent of acid substances.

SUMMARY OF THE INVENTION

The present invention greatly improves the hydrothermal stability of alumina desiccants and simultaneously reduces the dust formation with activated aluminas. The modified adsorbent maintains low reactivity and is still suitable for application in reactive streams.

The existing processes for manufacturing activated alumina can easily accommodate the production of the hydrothermally stable alumina described in the present invention. The additives used are inexpensive and no adverse environmental effects are expected. No heat treatment is needed as is the case in the prior art methods to prepare a thermally stable alumina carrier.

The hydrothermally stable alumina desiccants of the present invention will prolong the lifetime and improve the performance of all processes employing thermal regeneration of the adsorbent. Severe regeneration applications such as natural gas drying will especially benefit from this invention.

The transition alumina phases formed by rapid calcinations of aluminum hydroxide have high BET surface area and are very reactive toward water. While this feature is generally useful since it helps forming beads by agglomeration and allow for the fast pick up of moisture during adsorption, in long term, especially at severe conditions of thermal regeneration of the adsorbent, it causes irreversible re-hydration effects, which speed up the aging process of alumina.

It is well known that the hydrothermal aging consists of conversion of the high surface area alumina phases to crystalline Boehmite (AlOOH) which has low BET surface area and is a poor adsorbent. The formation of crystalline Boehmite can be observed with several techniques such as X-ray diffraction, infrared spectroscopy and thermal gravimetric analysis (TGA).

Activation at higher temperature increases somewhat the hydrothermal stability of alumina since it produces alumina phases, which are more stable toward re-hydration. Unfortunately, the BET surface area and the adsorption capacity decline after high temperature calcinations. On the other hand, this approach achieves only a moderate improvement of the hydrothermal stability of alumina.

The present invention provides a process of making a hydrothermally stable alumina adsorbent comprising mixing together a solution containing a silica compound with a quantity of alumina powder to produce alumina particulates, curing the alumina particulates and then activating said cured alumina particulates to produce a hydrothermally stable alumina adsorbent. In the preferred embodiment of the invention, the alumina particulates are treated with water or a colloidal silica solution.

The hydrothermally stable alumina adsorbent comprises silica containing alumina particles comprising a core, a shell and an outer surface. The core contains between about 0.4 to 4 wt-% silica wherein said silica is homogeneously distributed throughout the core and the shell extends up to 50 micrometers from the outer surface towards the core. Typically, the shell contains on average at least two times more silica than the core.

DETAILED DESCRIPTION OF THE INVENTION

In the present invention, we found that the stability of the alumina toward rehydration increases significantly by introducing silica in the course of the activated alumina manufacturing process. Surprisingly, no high temperature or activating agents are needed to achieve major improvement of the hydrothermal stability. The term "silica" as used herein refers to a variety of silicon inorganic compounds ranging from colloidal solution of silica to silicic acid or alkali metal silicates. Ullmann's ENCYCLOPEDIA OF INDUSTRIAL CHEMISTRY, Sixth Edition, Wiley-VCH, 2003, Vol. 32, pages 411-418 lists soluble inorganic silicon compounds that are suitable for the purposes of the invention.

Inorganic silicon compound with limited solubility could be also useful for the purpose of the invention since their solubility enhances upon the presence of transition alumina that has strong affinity to silicon compounds. Thus, the transfer of discrete silicon moieties from the solid inorganic compound through the surrounding liquid towards transitional alumina could be facilitated.

One theory to explain the positive effect of the silica compound is that silica species tend to adhere to the most active sites on the alumina surface, which are prone to fast rehydration. Thus, the silica species will then "deactivate" such rehydration sites by preventing them from further reacting with water upon formation of unwanted hydroxyl compound of alumina.

Although a mere spraying of activated alumina beads with colloidal silica improves the hydrothermal stability, a very strong improvement is achieved when a soluble silica compound is admixed to the nodulizing liquid, which is used to form alumina beads in a rotating tub, for example.

The alumina particulates that are treated in this invention are powders that have a size generally in the range of about 1 to 20 microns, while the alumina beads that are eventually formed would have a formed size of about 500 to 11,200 microns, preferably from about 1,000 to 6,300 microns, corresponding to a particle size according to US Standard screen sizes from 18 to ¼" mesh. The alumina particulates are subjected to a curing step at a temperature that can range from about 40-70° C., preferably from about 50-65° C. The duration of the curing step is for about 2-48 hours, preferably about 6 hours. It has been found that a curing step for less than 2 hours results in agglomerates being formed that have poor physical strength for use in drying natural gas.

Strong improvement of both hydrothermal stability and dustiness can be attained by forming alumina particulates in presence of silica followed by spraying of the particulates with a colloidal silica solution. The amount of silica can range from 0.1 to 8 wt-%. Addition of less that 5% silica is sufficient to produce a strong improvement in the hydrothermal stability. Normally, addition of about 2% silica is adequate for producing alumina with excellent hydrothermal stability.

The adsorbents of the present invention are a hydrothermally stable alumina adsorbent that comprises silica containing alumina particles comprising a core, a shell and an outer surface The core contains between about 0.4 to 4 wt-% silica with the silica homogeneously distributed throughout the core. The shell extends up to 50 micrometers from the outer surface towards the core and the shell contains on average at least two times more silica than the core.

The adsorbents of the present invention can be used for thermal swing process for drying and purification of gas and liquid streams. Among the most important types of gas streams that can be treated are natural gas, process gases in a variety of industrial processes such as refining and air prepurification in the air separation industry. Pressure swing adsorption processes can be operated with these adsorbents with long-term stability towards rehydration and chemical attack combined with dust free operation.

The following examples illustrate the present invention.

EXAMPLE 1

Flash calcined alumina powder A-300 manufactured by UOP, Des Plaines, Ill., was fed into a 4 feet rotating tub at a rate of 0.8 lbs/min. Water at a rate of 0.5 lb/min was also continuously supplied using a pump and nozzle assembly. Small amount of 30×40 mesh alumina seed was charged first into the nodulizer in order to initiate forming of larger alumina beads. The operation continued until about 50 lbs of material (8×14 mesh nominal particle size) were accumulated. The sample was cured upon storage in a closed container. Subsequently, about 4.5 lbs of the sample was charged into a one feet pot and rotated for about 5 minutes while sprayed with about 120 cc water. The sample was then immediately activated at 400° C. for one hour using an oven with forced air circulation. We refer to this sample as to AlWW where W designates water used in both forming and additional spraying operations.

EXAMPLE 2

The procedure described in Example 1 was used except that 4.5 lbs of alumina particulates were sprayed with a colloidal silica solution (Nalco 1130) to achieve addition of 0.8 mass-% $SiO_2$ calculated on an volatile free alumina basis. We refer to this sample as to AlWSi where Si stands for the silica used in the spraying operation.

EXAMPLE 3

Flash calcined alumina powder A-300 manufactured by UOP, Des Plaines, Ill., was fed into a 4 feet rotating tub at a rate of 0.8 lbs/min while a pump and nozzle assembly continuously supplied at a rate of 0.51 lbs/min a sodium silicate solution. The solution consisted of 1 part Grade 40 sodium silicate and about 8 parts water. Small amount of 30×40 mesh alumina seed was charged first into the nodulizer in order to initiate forming of larger alumina particulates. The operation continued until about 50 lbs of material were accumulated. The particle size fraction 8×14 mesh was separated and subjected to curing in a closed container. Subsequently, about 4.5 lbs of the sample was charged into a one feet pot, sprayed with about 120 cc water and activated as described in Example 1. The silica content of this sample is about 2.2 mass-% as calculated on a volatile free alumina basis. This sample is referred to as AlSiW.

EXAMPLE 4

Spherical particulates were prepared and cured as described in Example 3. Instead of water, the particulates were sprayed with a colloidal silica solution and activated as described in Example 2. This sample is referred to as AlSiSi in order to show that Si is used in both forming and final spraying stage of material preparation.

The samples were tested for hydrothermal stability in an electric pressure steam sterilizer (All American, model #25×). Six portions, five grams each, of the same sample were placed into the sterilizer and subjected to steam treatment for about 17.5 hours at 17 to 20 psi (122° to 125° C.). The samples were tested after the treatment for Boehmite formation using a FTIR method. A composite sample was prepared by merging the individual samples and BET surface area was determined using the standard method with 300° C. activation step. BET surface area was also measured on the samples before the hydrothermal treatment.

Table 1 compares all the data, including data for other commercial desiccants.

TABLE 1

| Sample | Description | BET before treatment $m^2/g$ | BET after treatment $m^2/g$ | Difference $m^2/g$ | % Decrease |
|---|---|---|---|---|---|
| AlWW | Example 1 | 359 | 181 | 178 | 49.6% |
| AlWSi | Example 2 | 359 | 211 | 148 | 41.2% |
| AlSiW | Example 3 | 317 | 318 | −1 | −0.3% |
| AlSiSi | Example 4 | 305 | 321 | −16 | −5.2% |
| CA-1 | Commercial alumina | 343 | 200 | 143 | 41.7% |
| CA-2 | Commercial alumina | 360 | 200 | 160 | 44.4% |
| SCA | Commercial Si coated alumina | 340 | 264 | 84 | 24.7% |
| SA | Commercial silica alumina | 677 | 512 | 165 | 24.4% |

Table 1 shows that introducing colloidal silica helps to increase the hydrothermal stability—compare AlWW to AlWSi sample and the SCA sample to CA-2 sample (SCA is prepared by silica coating of alumina beads). However, a strong increase of the hydrothermal; stability is observed when Si is introduced while forming particulates—Examples 3 and 4. The samples AlSiW and AlSiSi have a higher BET surface area than do the fresh samples after hydrothermal treatment.

Table 2 shows that spraying with colloidal silica is needed to reduce the dustiness of the Si nodulized alumina particulates. Nodulizing in presence of an inorganic silica compound, such as sodium silicate, followed by spraying with colloidal silica allows for strong improvements in both hydrothermal stability and dustiness.

The dustiness was measured using turbidity measurements as practiced for alumina and other adsorbents.

TABLE 2

| Sample | Description | Turbidity NTU Units |
|---|---|---|
| AlWW | Example 1 | 44.0 |
| AlWSi | Example 2 | 10.6 |
| AlSiW | Example 3 | 107.0 |
| AlSiSi | Example 4 | 35.4 |

The data suggests that introducing up to 2-3% $SiO_2$ with the nodulizing liquid would strongly increase the hydrothermal stability of alumina. Treatment with colloidal silica to add additionally 1-2% $SiO_2$ is then needed since the Si nodulized material tends to be dustier than the water nodulized alumina.

Sodium silicate was used herein because it is cheap and readily available. Other silica compounds may be used.

A possible advantage of an alkali metal silicate is that it contains an alkali metal, which can "neutralize" some acid sites should active aluminosilicate form upon thermal treatment.

The invention claimed is:

1. A process of making a hydrothermally stable alumina adsorbent consisting of mixing a solution containing a silica compound with a quantity of alumina powder having a size of about 1 to 20 microns to produce alumina particulates, curing said alumina particulates at about 40-70° C. for about 2-48 hours and then activating said cured alumina particulates to produce said hydrothermally stable alumina adsorbent.

2. The process of claim 1 wherein said alumina particulates are cured at about 50-65° C.

3. The process of claim 1 wherein said alumina particulates are cured for about 6 hours.

4. The process of claim 1 wherein said silica compound is at least one compound selected from the group consisting of alkali and alkaline earth metal silicates.

5. The process of claim 1 wherein said hydrothermally stable alumina adsorbent comprises between 0.1 and 8 percent by weight silica.

6. The process of claim 1 wherein said hydrothermally stable alumina adsorbent comprises between 2 to 4 percent by weight silica.

7. The process of claim 1 wherein said hydrothermally stable alumina adsorbent comprises about 2 percent by weight silica within said adsorbent and about 2 percent by weight silica coating said adsorbent.

8. The process of claim 1 wherein said hydrothermally stable alumina adsorbent comprises silica containing alumina particles comprising a core, a shell and an outer surface, said core containing between about 0.4 to 4 wt-% silica wherein said silica is homogeneously distributed throughout said core and said shell extending up to 50 micrometers from said outer surface towards said core and wherein said shell contains on average at least two times more silica than said core.

* * * * *